Dec. 31, 1935.                G. HEYMER                2,025,862
                           ILLUMINATING DEVICE
                          Filed Sept. 20, 1932
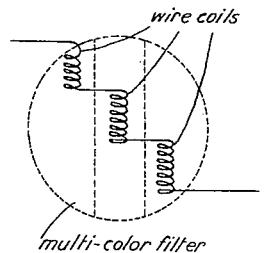
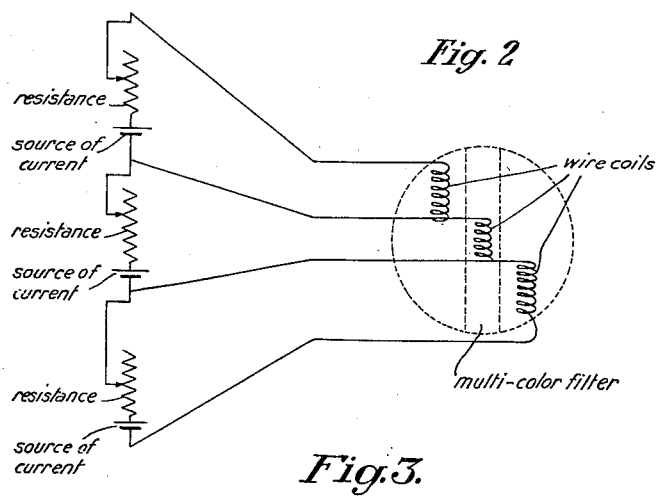
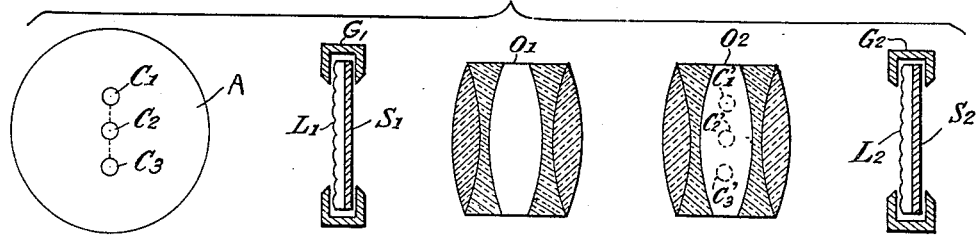
Inventor:
Gerd Heymer,
By Attorney
Philip S. Hopkins.

Patented Dec. 31, 1935

2,025,862

UNITED STATES PATENT OFFICE 2,025,862

ILLUMINATING DEVICE

Gerd Heymer, Dessau-Ziebigk, Germany, assignor to Agfa Ansco Corporation, Binghamton, N. Y., a corporation of New York Application September 20, 1932, Serial No. 634,073
In Germany September 26, 1931

5 Claims. (Cl. 88—24)

My present invention relates to an illuminating device and more particularly to such a device to be employed in printing lenticular films.

One of its objects is to provide an illuminating device to be used in printing lenticular films whereby the insertion of a color filter or a diaphragm can be dispensed with. Further objects will be seen from the detailed specification following hereafter. Reference is made to the accompanying drawing in which Fig. 1 diagrammatically represents a device according to my invention, Fig. 2 diagrammatically represents another embodiment of my invention, and Fig. 3 shows diagrammatically an arrangement for printing with my illuminating device.

I have found that a filter or diaphragm for the illumination of the negative film in printing lenticular film can be dispensed with when illuminating the negative film by means of an incandescent lamp the coils of which are arranged in the form of a stair in such a manner that a line drawn in the plane of the filaments perpendicularly to the direction of the stripes of the filter will intersect only one filament. When observing these conditions the wire coils may have any position within the space corresponding with one color area, however, in a preferred arrangement the optical centers of the coils lie each on one of the straight lines drawn parallel to the direction of the filter stripes through the point occupied by the optical centers of the stripes or of their virtual images during the taking operation. The use of such a lamp involves the advantage that all the light projected towards the negative film is available in the printing process and that a uniform illumination is ensured. The wire coils of the incandescent lamp are arranged in a common plane parallel to the negative film or perpendicular to the optical axis of the printing device and occupying the same position with respect to the negative film as did the plane of the multicolor filter or its virtual image during the taking of the negative.

The invention will be better understood by reference to the accompanying drawing. Fig. 1 shows the arrangement of the wire coils of the illuminating device in form of a stair. Behind the wire coils there is shown in dotted lines the multi-color filter or its virtual image through which the negative is taken. The wire coils are connected in series. In order to ensure a uniform color on the print the distance of the parallel wire coils preferably correspond with the distance of the optical centers of the multi-color filter used in taking the negative, or the virtual image of that filter.

In Fig. 2 there is shown a preferred arrangement of the wire coils in which each wire coil lies in a special circuit. Thus, the intensity of each coil can be regulated separately. As seen in Fig. 2 each circuit includes a source of current and a resistance which permits the regulation of the light intensity and also if desired the interruption of the circuit. By regulating each wire coil independently all the coils can be adjusted as to have the same intensity of light, or, if in the print a color is predominant, due to a mistake in taking the picture or another mistake, it can be reduced in effect. The light intensity of the wire coil which yields the color sensation corresponding with the dominant color, is reduced and thus a compensation is obtained.

The extension of the glass bulb of the incandescent lamp perpendicular to the common plane of the wire coils must be smaller than the distance of the virtual image of the multi-color filter from the film in taking the negative. Furthermore, the glass bulb must not reflect pictures of the wire coils. For this purpose the glass bulb can be given a suitable form or it is dulled or blackened on the inner surface remote from the film.

The device according to this invention can be used in all cases of optically printing lenticular film in which an image or the source of light is projected between the negative and the positive film, for instance, in the process described in my copending application Serial Number 446,323, filed April 22, 1930 matured into U. S. Patent 1,915,418. Furthermore, it can be employed in all those cases of contact printing in which there is made use of a diaphragm with openings arranged in a stair-like manner, for instance, as disclosed in French Patent No. 730,525.

Fig. 3 shows the application of my illuminating device for printing according to my above Patent 1,915,418. In this figure A is an incandescent lamp with the wire coils $C_1$, $C_2$ and $C_3$ arranged in the form of steps. The lenticular film $L_1$ with the layer $S_1$ remote from the source of light is arranged in the picture gate $G_1$. By means of the objective $O_1$ an image of the wire coils $C_1$, $C_2$ and $C_3$ is projected to $C_1'$, $C_2'$ and $C_3'$ in the narrowest optically effective aperture of the objective $O_2$. The objective $O_2$ projects together with the objective $O_1$ the lenticular film $L_1S_1$ on the emulsion layer $S_2$ of the lenticular film $L_2$ which is arranged in the picture gate $G_2$.

My invention is not limited to the arrangements shown in the drawing it being understood that the same are only given by way of example. The wire coils may be arranged in the same bulb or in several bulbs.

What I claim is:

1. In a printing device for lenticular films, in combination a lenticular film bearing an original in its emulsion layer, a printing film arranged in printing relation to said original, and an illuminating device comprising wire coils of an incandescent lamp, corresponding in number to the number of color areas of the multi-color filter used in taking the original, each of said wire coils being arranged within the space and at a distance from said original as occupied by one color area of the taking filter during exposure, so that a line drawn in the plane of the filaments perpendicularly to the direction of the filter stripes intersects only one filament.

2. In a printing device for lenticular films, in combination a lenticular film bearing an original in its emulsion layer, a printing film arranged in printing relation to said original, and an illuminating device comprising parallel wire coils of an incandescent lamp corresponding in number to the number of color areas of the multi-color filter used in taking the original, each of said wire coils being arranged within the space and at a distance from said original as occupied by one color area of the taking filter during exposure, so that a line drawn in the plane of the filaments perpendicularly to the direction of the filter stripes intersects only one filament.

3. In a printing device for lenticular films, in combination a lenticular film bearing an original in its emulsion layer, a printing film arranged in printing relation to said original, and an illuminating device comprising wire coils of an incandescent lamp arranged parallel to each other and corresponding in number to the number of color areas of the multi-color filter used in taking the original, said wire coils being arranged in form of a stair at distances from each other corresponding with the distances of the optical centers of the areas of the multi-color filter and at a distance from said original corresponding with the distance of the multi-color filter used in taking the original.

4. In a printing device for lenticular films, in combination a lenticular film bearing an original in its emulsion layer, a printing film arranged in printing relation to said original, and an illuminating device comprising wire coils of an incandescent lamp arranged parallel to each other and corresponding in number to the number of color areas of the multi-color filter used in taking the original, each of said wire coils being arranged within the space and at a distance from said original as occupied by one color area of the taking filter during exposure, so that a line drawn in the plane of the filaments perpendicularly to the direction of the filter strips intersects only one filament, said wire coils being connected in series.

5. In a printing device for lenticular films, in combination a lenticular film bearing an original in its emulsion layer, a printing film arranged in printing relation to said original, and an illuminating device comprising wire coils of an incandescent lamp arranged parallel to each other and corresponding in number to the number of color areas of the multi-color filter used in taking the original, each of said wire coils being arranged within the space and at a distance from said original as occupied by one color area of the taking filter during exposure, so that a line drawn in the plane of the filaments perpendicularly to the direction of the filter strips intersects only one filament, said wire coils being connected in parallel.

GERD HEYMER.